United States Patent
Nakaya et al.

(10) Patent No.: US 7,498,402 B2
(45) Date of Patent: Mar. 3, 2009

(54) METHOD FOR PURIFYING MATERIAL TO BE TREATED AND METHOD FOR PRODUCING COAGULATED MATERIAL

(75) Inventors: Hideki Nakaya, Settsu (JP); Tadahiro Yabu, Settsu (JP); Mitsuo Tsukamoto, Settsu (JP); Kenji Otoi, Settsu (JP); Yoshiyuki Hiraga, Settsu (JP); Yuji Imahori, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 249 days.

(21) Appl. No.: 10/562,731

(22) PCT Filed: Jul. 5, 2004

(86) PCT No.: PCT/JP2004/009546

§ 371 (c)(1),
(2), (4) Date: Dec. 30, 2005

(87) PCT Pub. No.: WO2005/003190

PCT Pub. Date: Jan. 13, 2005

(65) Prior Publication Data

US 2006/0151391 A1    Jul. 13, 2006

(30) Foreign Application Priority Data

Jul. 3, 2003   (JP) ............................. 2003-191416
Mar. 12, 2004  (JP) ............................. 2004-071744

(51) Int. Cl.
C08F 6/00  (2006.01)
C08J 3/00  (2006.01)

(52) U.S. Cl. ................. 528/502; 210/634; 210/639; 526/144; 570/124; 570/177

(58) Field of Classification Search ................. 210/634, 210/639; 526/144; 528/502 R; 570/124, 570/177
See application file for complete search history.

(56) References Cited

U.S. PATENT DOCUMENTS

| 5,780,565 A | * | 7/1998 | Clough et al. ............... 526/206 |
| 6,972,094 B2 | | 12/2005 | Ichida et al. |
| 2004/0010156 A1 | | 1/2004 | Kondo et al. |

FOREIGN PATENT DOCUMENTS

| EP | 0 442 679 A1 | | 8/1991 |
| EP | 442679 | * | 8/1991 |
| EP | 0 770 096 A1 | | 5/1997 |
| JP | 4-214706 | | 8/1992 |
| JP | 4-214706 A | | 8/1992 |
| JP | 7-134435 | | 5/1995 |
| JP | 10-502691 | | 3/1998 |
| JP | 10-502691 A | | 3/1998 |
| JP | 2002-58966 | | 2/2002 |
| JP | 2002-59160 | | 2/2002 |
| WO | 96/01850 | | 1/1996 |
| WO | 96/01851 | | 1/1996 |

* cited by examiner

*Primary Examiner*—Terressa M Boykin
(74) *Attorney, Agent, or Firm*—Sughrue Mion, PLLC

(57) ABSTRACT

A method of purifying a treatment target substance containing a fluorine-containing surfactant which includes removing at least part of the fluorine-containing surfactant from the treatment target substance by contacting the treatment target substance with a gas containing carbon dioxide. The fluorine-containing surfactant is an ether oxygen-free anionic compound represented by one of general formulae (1) and (2) as defined herein.

15 Claims, 5 Drawing Sheets

METHOD FOR PURIFYING MATERIAL TO BE TREATED AND METHOD FOR PRODUCING COAGULATED MATERIAL

TECHNICAL FIELD

The present invention relates to a method of purifying a treatment target substance and a method of producing an aggregate.

BACKGROUND ART

Fluorine-containing surfactants have been utilized as emulsifiers in producing polymers by emulsion polymerization and as coagulation stabilizers. Recently, development works have been made actively to reduce the fluorine-containing surfactant content in products. For example, the reverse osmosis membrane method (cf. e.g. Patent Document 1) and the ion exchange membrane method (cf. e.g. Patent Document 2) have been investigated as the methods of recovering the fluorine-containing surfactant in aqueous solutions. However, these membrane methods encounter a problem from the cost viewpoint since when used for the treatment of fluorine-containing surfactant solutions containing an uncoagulated polymer, the membranes are readily contaminated and membrane exchange is required each time.

Fluorine-containing surfactants have been utilized in emulsion polymerization of fluoropolymers, among others. The technology of purifying a tetrafluoroethylene resin powder (trademark: Lubron L-2) as a fluoropolymer with carbon dioxide in a supercritical condition has been proposed (cf. e.g. Patent Document 3). However, Lubron L-2 is a product reduced in molecular weight by irradiation with γ rays, and it is considered that no fluorine-containing surfactant may remain therein.

Polymers can be obtained in the form of aqueous dispersions by emulsion polymerization, for instance, and the technique for coagulation for producing powders thereof by adding a coagulation aid such as an electrolyte or a water-soluble organic solvent to the aqueous dispersions and stirring the resulting mixtures has been established and used for long.

On the occasion of fluorine-containing surfactant recovery or polymer coagulation, substantially polymer-free aqueous solutions containing a fluorine-containing surfactant are formed. These aqueous solutions have so far been discarded as industrial waste water. From the waste disposal treatment viewpoint, however, it is desirable that the fluorine-containing surfactant content be reduced.

Patent Document 1: Japanese Kokai Publication 2002-58966
Patent Document 2: Japanese Kokai Publication 2002-59160
Patent Document 3: Japanese Kokai Publication H07-134435 (Example Section)

DISCLOSURE OF INVENTION

Problems which the Invention is to Solve

In view of the above-discussed state of the art, it is an object of the present invention to provide a method of removing fluorine-containing surfactants from treatment target substances containing fluorine-containing surfactants and a method of producing aggregates comprising polymer from aqueous dispersions thereof. The latter method includes the one using a novel coagulation method.

Means for Solving the Problems

The present invention provides a method of purifying a treatment target substance comprising carrying out a removing treatment of a fluorine-containing surfactant by bringing the above treatment target substance containing the above fluorine-containing surfactant into contact with a substance B, wherein the above substance B is a gas under standard conditions ($10^5$ Pa, 0° C.).

The invention also provides a method of producing an aggregate, which comprises producing an aggregate comprising a polymer using the above-mentioned method of purifying the treatment target substance.

The invention further provides a method of preparing a fluorine-containing-surfactant-reduced water, which comprises preparing the fluorine-containing-surfactant-reduced water reduced in fluorine-containing surfactant content using the above-mentioned method of purifying the treatment target substance.

The invention further provides a method of producing an aggregate for the production of the aggregate comprising a polymer, which comprises the step of carrying out a coagulation treatment of an aqueous dispersion by bringing the above aqueous dispersion in which a particle comprising the above polymer is dispersed into contact with an substance B, the above substance B being a gas under standard condition ($10^5$ Pa, 0° C.).

In the following, the present invention is described in detail.

The method of purifying a treatment target substance according to the invention comprises carrying out a removal treatment of a fluorine-containing surfactant by bringing the treatment target substance containing the fluorine-containing surfactant into contact with a substance B.

The treatment target substance is the target to be brought into contact with the substance B in the above removal treatment. In the following, when a water-containing substance taken as an example of the treatment target substance is described, it is only required that the substance satisfy the requirements contained in the description only at least at the time of starting contacting with the substance B. The treatment target substance may be a solid or a liquid at ordinary temperature and pressure (e.g. 20° C. and $10^5$ Pa).

The treatment target substance contains a fluorine-containing surfactant(s).

The fluorine-containing surfactant contains fluorine atoms within the molecular structure thereof, is capable of micelle formation, and further has a hydrophilic group and a hydrophobic group.

The fluorine-containing surfactant preferably comprises a fluorine-containing compound containing not more than 38 carbon atoms per molecule. When the number of carbon atoms per molecule exceeds 38, the surfactant activity may decline in certain cases. A more preferred upper limit to the number of carbon atoms per molecule is 14, a still more preferred upper limit is 10, a preferred lower limit is 4, and a more preferred lower limit is 6. The number of carbon atoms per molecule is preferably 8. The fluorine-containing compound may contain one or more heteroatoms in addition to fluorine atoms. The "heteroatom" so referred to herein is an atom which is neither carbon atom nor hydrogen atom and, as such atom, there may be mentioned, for example, oxygen, nitrogen, chloride, bromine or iodine atom. The oxygen atom may form an ether linkage.

The fluorine-containing compound is preferably an ether oxygen-free anionic compound represented by the general formula (1):

$$Y-(CF_2)_{x1}-(CH_2)_{y1}-A \qquad (1)$$

wherein Y represents H or F, x1 represents an integer of 4 to 13, y1 represents an integer of 0 to 3 and A represents —SO₃M or —COOM (in which M represents H, NH₄, Li, Na or K), or an ether oxygen-containing anionic compound represented by the general formula (2):

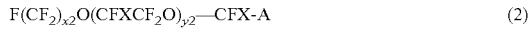
$$F(CF_2)_{x2}O(CFXCF_2O)_{y2}—CFX-A \quad (2)$$

wherein x2 represents an integer of 1 to 5, y2 represents an integer of 0 to 10, X represents F or CF₃ and A is as defined above.

The ether oxygen-free anionic compound is more preferably a compound represented by the general formula (1a):

$$Y—(CF_2)_{x3}—(CH_2)_{y3}\text{-}A \quad (1a)$$

wherein x3 represents an integer of 6 to 10, y3 represents an integer of 0 to 2 and Y and A are as defined above, still more preferably a compound represented by the general formula (1b):

$$Y—(CF_2)_{x4}\text{-}A \quad (1b)$$

wherein x4 represents an integer of 6 to 10 and Y and A are as defined above.

The ether oxygen-containing anionic compound is more preferably a compound represented by the general formula (2a):

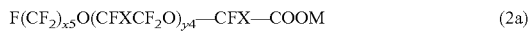
$$F(CF_2)_{x5}O(CFXCF_2O)_{y4}—CFX—COOM \quad (2a)$$

wherein x5 represents an integer of 1 to 5, y4 represents an integer of 0 to 3 and X and M are as defined above, still more preferably a compound represented by the general formula (2b):

$$F(CF_2)_{x6}O(CF(CF_3)CF_2O)_{y5}—CF(CF_3)—COOM \quad (2b)$$

wherein x6 represents an integer of 1 to 3, y5 represents an integer of 0 to 3 and M is as defined above.

From the viewpoint of ready removability from fluoropolymers, the above-mentioned M is preferably NH₄.

In the practice of the invention, the fluorine-containing surfactant is not particularly restricted but may be, for example, the one originating in the use thereof as an emulsifier in an aqueous medium on the occasion of polymer production by radical polymerization in that aqueous medium. The radical polymerization includes emulsion polymerization, suspension polymerization and so forth; emulsion polymerization is preferred, however. The aqueous medium is a reaction medium in which the polymerization is carried out; it means a water-containing liquid. The aqueous medium is not particularly restricted provided that it contains water. Thus, it may comprise water and a fluorine-free organic solvent such as an alcohol, ether or ketone and/or a fluorine-containing organic solvent having a boiling point of not lower than 40° C. Fluorine-containing organic solvents can be used in carrying out suspension polymerization, for instance.

The treatment target substance to be treated by the method of purifying the treatment target substance of the invention preferably comprises water in addition to the fluorine-containing surfactant mentioned above.

As the treatment target substance comprising the fluorine-containing surfactant and water, there may be mentioned, for example, an aqueous dispersion comprising a dispersoid dispersed in water as an aqueous medium in the presence of the fluorine-containing surfactant, an aqueous nondispersion, a wet powder, and the treatment target substance (3) described later herein.

When the treatment target substance contains water, the method of purifying a treatment target substance of the invention does not need the addition, as an entrainer, of an organic solvent, for example a ketone such as methyl ethyl ketone or an ester such as ethyl acetate.

The treatment target substance to be treated by the method of purifying a treatment target substance of the invention may be the one comprising the fluorine-containing surfactant and, further, a polymer and water.

As the treatment target substance comprising the fluorine-containing surfactant, a polymer and water (hereinafter such substance is sometimes referred to as "treatment target substance (1)"), there may be mentioned, for example, an aqueous dispersion which the polymer disperses in an aqueous medium comprising water in the presence of the fluorine-containing surfactant. The "treatment target substance" merely so referred to herein without adding (1), (2) or (3) as in the treatment target substance (1) mentioned above, the treatment target substance (2) or treatment target substance (3) mentioned later herein, unless otherwise specified, conceptually includes all those three substances, namely the treatment target substance (1), treatment target substance (2) and treatment target substance (3).

As the above-mentioned aqueous dispersion, there may be mentioned, for example, an aqueous dispersion comprising polymer particles (primary particles) obtained by carrying out radical polymerization in the above aqueous medium in the presence of a fluorine-containing surfactant and dispersed in the aqueous medium in the presence of the fluorine-containing surfactant (such dispersion is hereinafter sometimes referred to as "aqueous dispersion (1)"). The aqueous dispersion (1) may be the one that has undergone a concentration treatment. Generally, the aqueous dispersion (1) is further subjected to coagulation/flocculation, and the coagulation/flocculation treatment mentioned above generally causes the above-mentioned primary particles to form particles (secondary particles) increased in particle diameter. The treatment target substance (1) may be the aqueous dispersion (1) before such coagulation or like treatment. From the fluorine-containing surfactant removal efficiency viewpoint, the aqueous dispersion after the coagulation or like treatment (hereinafter such dispersion is sometimes referred to "aqueous dispersion (2)") is preferred. The aqueous dispersion (2) so referred to herein conceptually includes the ones containing, in the aqueous medium, a precipitate or floating secondary particles, or crumb-like aggregates resulting from aggregation or agglomeration of primary particles. The method of coagulation is not particularly restricted but may be any of the conventional methods, for example the method comprising adding a coagulation aid such as an electrolyte or a water-soluble organic solvent or adding an acid.

The treatment target substance (1) may also be such one that comprises the fluorine-containing surfactant and, further, a polymer and water and occurs as an aqueous nondispersion or a wet powder.

The "aqueous nondispersion or wet powder" so referred to herein is not the above aqueous dispersion but is a liquid or solid material or a two-layer system comprising a liquid phase and a solid phase. The "aqueous nondispersion" so referred to herein may also be a precipitate-containing one.

As the aqueous nondispersion, there may be mentioned, for example, the one in which a solid and an aqueous solution of a fluorine-containing surfactant occur in such a condition that phase separation is observable by the naked eye without intermingling with each other. The aqueous nondispersion may be, for example, the one derived from the aqueous dispersion (1) mentioned above by polymer precipitation by means of mechanical shearing or addition of such a coagulation aid as mentioned above, for instance, or a liquid resulting from addition of water to a powder comprising a polymer and a fluorine-containing surfactant to an extent such that the condition of phase separation may not be destroyed. In the above aqueous nondispersion material, the fluorine-containing surfactant is considered to be found mainly adhering to the precipitated polymer or the like.

The wet powder mentioned above is a polymer-based powder containing a fluorine-containing surfactant and water. The wet powder preferably has a water content exceeding 0.1 part by mass, more preferably exceeding 1 part by mass, per 100 parts by mass of the nonwater components other than water. So long as the content of water in the wet powder falls within the above range, it is generally preferred that the water content be not higher than 300 parts by mass, more preferably not higher than 150 parts by mass, per 100 parts by mass of the nonwater components other than water.

As the wet powder, there may be mentioned, for example, the one obtained by filtration of the aqueous nondispersion mentioned above.

The above-mentioned aqueous nondispersion or wet powder is preferred as the treatment target substance (1) from the fluorine-containing surfactant removal efficiency viewpoint. In the aqueous nondispersion or wet powder, the polymer particles with the fluorine-containing surfactant adhering thereto generally has a narrowed surface area as compared with the aqueous dispersion as a result of coagulation, for instance. Therefore, supposedly, the fluorine-containing surfactant, upon contacting with the substance B, readily migrates to the substance B side, resulting in an increased rate of extraction of the fluorine-containing surfactant, hence in good removal efficiency.

When supercritical carbon dioxide, for instance, is used as the substance B, as described later herein, the treatment target substance (1) can be efficiently deprived of the fluorine-containing surfactant, for example, by blowing supercritical carbon dioxide into the wet powder obtained, for example, by coagulation and filtration of the aqueous dispersion (1), followed by rough draining of the water (aqueous medium). Under certain water content and other conditions, it is also possible to remove the surfactant in question substantially completely. The conventional drying step following coagulation is no more necessary, and this leads to process simplification as well.

The treatment target substance may also be the one comprising the fluorine-containing surfactant and, further, a polymer, and the treatment target substance may also be the one substantially free of water.

The phrase "substantially free of water" as used herein referring to the above treatment target substance comprising the fluorine-containing surfactant and a polymer and substantially free of water (hereinafter such substance is sometimes referred to as "treatment target substance (2)") means that the content of water relative to the total mass of the polymer and fluorine-containing surfactant is preferably not higher than 1%.

As the treatment target substance (2), there may be mentioned, for example, a powder comprising the polymer and the fluorine-containing surfactant intermingled therewith.

The above powder may be a dry powder obtained by drying the wet powder mentioned above. The powder is the one obtained from the aqueous dispersion (2) after such a treatment as coagulation and is composed of secondary particles formed by the coagulation treatment, among others.

The polymer in the treatment target substance (1) or treatment target substance (2) is preferably a fluoropolymer.

When the fluoropolymer is elastomeric, the present invention can be applied to the treatment target substance to be treated according to the invention generally in the form of the one comprising such secondary particles occurring in an aqueous medium, namely in the form of the treatment target substance (1). When the fluoropolymer is elastomeric, the treatment target substance may also have the form of crumb-like aggregates resulting from aggregation or agglomeration of primary particles. The above treatment target substance takes the crumb-like aggregate form since the elastomeric fluoropolymer generally has a low glass transition point, so that primary particles or secondary particles cannot maintain their forms at room temperature but are fused together to form aggregates. The crumb-like aggregates are also called crumbs.

The present invention can be applied to the crumbs mentioned above as the treatment target substance (1) or treatment target substance (2) according to the water content thereof.

When the fluoropolymer is resinous, the treatment target substance to be treated according to the invention may be either the one comprising secondary particles occurring in an aqueous medium or the one occurring as a powder comprising secondary particles, and the present invention can be applied thereto either as the treatment target substance (1) or as the treatment target substance (2) according to which form it has.

The "fluoropolymer" so referred to herein is a polymer containing carbon atom-bound fluorine atoms. In the practice of the invention, the fluoropolymer is the one obtained by polymerizing one or two or more fluorine-containing monomer species. It may also be the one obtained by copolymerization with a fluorine-free monomer. The "fluorine-containing monomer" is a monomer containing at least one carbon atom-bound fluorine atom. Such fluoropolymer will be described later herein.

The treatment target substance may also be the one comprising the fluorine-containing surfactant and, further, water, and the treatment target substance may be the one containing substantially no such polymer as mentioned above.

As the treatment target substance comprising the fluorine-containing surfactant and water and containing substantially no polymer (hereinafter such substance is sometimes referred to as "treatment target substance (3)") may be, for example, the supernatant obtained after coagulation of the polymer dispersed in water in the presence of a fluorine-containing surfactant, or a fluorine-containing surfactant solution obtained by merely dissolving a fluorine-containing surfactant in water. As the former supernatant, there may be mentioned, for example, the supernatant obtained by subjecting the aqueous dispersion (1) to a coagulation treatment.

The treatment target substance to be treated by the method of purifying the treatment target substance according to the invention is constituted of (i) water and (ii) a nonwater component other than water containing the fluorine-containing surfactant, and the nonwater component (ii) may further contain a polymer or contain no polymer, and the water (i) is preferably in an amount of more than 0.1 part by mass per 100 parts by mass of the nonwater component (ii). An excessively small or large amount of water tends to render the removal of the fluorine-containing surfactant unsatisfactory. A more preferred lower limit is 100 parts by mass, and a still more preferred lower limit is 400 parts by mass. Within the above range, an upper limit to the amount of water (i) which is preferred from the fluorine-containing surfactant removal efficiency viewpoint may be set at $10^{12}$ parts by mass, although it may vary depending on the amount of the substance B to be contacted therewith.

When the treatment target substance is the treatment target substance (1) the nonwater component (ii) of which contains a polymer, a more preferred lower limit to the amount of water (i) per 100 parts by mass of the nonwater component (ii) is 10 parts by mass, a more preferred lower limit is 150 parts by mass, a more preferred upper limit is $10^6$ parts by mass, a still more preferred upper limit is $10^4$ parts by mass, and a particularly preferred upper limit is 5000 parts by mass.

When the treatment target substance is the one the nonwater component (II) of which contains no polymer, namely the treatment target substance (3) mentioned above, a more preferred lower limit to the amount of water (i) per 100 parts by mass of the nonwater component (ii) is 100 parts by mass, a still more preferred lower limit is 400 parts by mass, a more preferred upper limit is $10^{11}$ parts by mass, and a still more preferred upper limit is $10^{10}$ parts by mass.

The method of purifying the treatment target substance according to the invention comprises carrying out a removal treatment of a fluorine-containing surfactant by bringing the above-mentioned treatment target substance into contact with a substance B.

The above-mentioned removal treatment of the fluorine-containing surfactant is the treatment for removing a part or the whole of the fluorine-containing surfactant contained in the treatment target substance from the treatment target substance.

The removal treatment of the fluorine-containing surfactant is carried out by bringing the treatment target substance into contact with the substance B. The fluorine-containing surfactant is dissolved and extracted in and with the substance B and separated, together with the substance B, from the treatment target substance now treated and thus removed from the treatment target substance now treated. The method of removal treatment of the fluorine-containing surfactant is not particularly restricted but, in the case of the treatment target substance (1) or treatment target substance (3), for instance, the treatment may be carried out using a batch system such as the one schematically shown in FIG. 1, or a semi-flow system in which the substance B is separated from the fluorine-containing surfactant after extraction of the same with the substance B and is again used for the removal treatment. The treatment target substance (2) such as a wet resin or elastomer powder may be treated within an extruding machine.

The substance B is a gas under standard condition ($10^5$ Pa, 0° C.).

The standard condition is a condition determined by the standard temperature and pressure at which physical properties of a substance are often determined or described.

As the substance B, there may be mentioned, among others, ethane, propane, dinitrogen monoxide, ammonia, fluoroform and other fluoro(hydro)carbons, and carbon dioxide. Among them, carbon dioxide is preferred since it is chemically stable, inexpensive and can realize a supercritical condition at relatively low temperature and pressure.

Unlike substances are liquids at the standard condition ($10^5$ Pa, 0° C.), for example liquid solvents such as organic solvents and water, the physical properties, for example the density, of carbon dioxide as a solvent can be controlled in a wide range by varying the two variables, namely temperature and pressure.

Furthermore, carbon dioxide is nontoxic and, therefore, is suited for use as an environment-friendly solvent.

When the treatment target substance contains water, carbon dioxide is dissolved in the water in the process of the removal treatment of the fluorine-containing surfactant and the treatment target substance becomes an acidic aqueous solution. By this or by converting the treatment target substance to an acidic aqueous solution by further addition of an acidic substance such as HCl, salt type fluorine-containing surfactants such as ammonium perfluorooctanoate [APFO], for instance, are supposedly converted to acid type fluorine-containing surfactants such as perfluorooctanoic acid [PFOA], which is relatively readily extractable.

When carbon dioxide is used as the substance B, the removal treatment of the fluorine-containing surfactant may be carried out by contacting with carbon dioxide at a treatment temperature and a treatment pressure at which carbon dioxide is gaseous. From the productivity or efficiency viewpoint, however, the contacting is preferably carried out at a temperature not lower than 20° C. and a pressure not lower than 4 MPa, more preferably at a temperature not lower than the critical temperature of carbon dioxide and at a pressure not lower than the critical pressure of carbon dioxide. The critical temperature of carbon dioxide is 31.1° C. and the critical pressure is 7.38 MPa. When carbon dioxide in a supercritical state is used as the substance B, the removal treatment of the fluorine-containing surfactant is preferably carried out at a temperature not higher than 230° C., preferably lower than 150° C., and a pressure not higher than 60 MPa, more preferably at a temperature lower than 150° C., preferably lower than 130° C., and a pressure not higher than 40 MPa.

When the removal treatment of the fluorine-containing surfactant is carried out using carbon dioxide in a supercritical state as the substance B, the fluorine-containing surfactant removal efficiency can be improved by increasing the density of carbon dioxide. Although this mechanism is not clear, it is supposed that the solubility of such a fluorine-containing surfactant as APFO increases with the increase in density of carbon dioxide.

As for the amount of carbon dioxide required for the removal treatment of the fluorine-containing surfactant, there is a relation such that the fluorine-containing surfactant concentration decreases as an exponential function of the carbon dioxide consumption, as shown in FIG. 2 and FIG. 3 and, therefore, it can roughly be estimated that for reducing the fluorine-containing surfactant concentration X times, it is necessary to multiply the amount of carbon dioxide X times.

When the fluorine-containing surfactant concentration values are plotted (ordinate) against the dimensionless quantity values derived from the carbon dioxide consumption values (abscissa) by dividing by the corresponding fluorine-containing surfactant quantity values, the extract quantity in the case of extraction with supercritical carbon dioxide generally arrives at an almost equilibrium level at the time when the above-defined dimensionless quantity becomes 50 to 60, as graphically shown in FIG. 6. The condition after arrival at "equilibrium" so referred to herein is the condition in which a further increase in carbon dioxide consumption will no longer cause any further reduction in fluorine-containing surfactant concentration.

The quantity of carbon dioxide as required for the removal treatment of the fluorine-containing surfactant may vary depending on the treatment target substance. When the treatment target substance is the above-mentioned aqueous dispersion comprising a polymer and water, there is a tendency for the carbon dioxide consumption required until arrival at equilibrium to be smaller as compared with the substantially polymer-free fluorine-containing surfactant solution mentioned above. This tendency is presumably due to the fact that the polymer is readily coagulated in the presence of carbon dioxide and the fluorine-containing surfactant occurring in water is adsorbed on the coagulated particles, for instance, and thus becomes readily removable from the treatment target substance.

The method of producing an aggregate according to the invention comprises producing the aggregate comprising a polymer using the above-mentioned method of purifying the treatment target substance. The method of producing the aggregate of the invention which uses the above-mentioned method of purifying the treatment target substance is hereinafter sometimes referred to as "aggregate-producing method (1)" of the invention.

The aggregate-producing method (1) of the invention uses the treatment target substance (1) or treatment target substance (2) in the above-mentioned method of purifying the treatment target substance. Although the treatment target substance (1) may be the aqueous dispersion (1) comprising primary polymer particles dispersed in an aqueous medium in the presence of a fluorine-containing surfactant, the aqueous dispersion (2) mentioned above is preferred. Preferred as the treatment target substance (2) is the above-mentioned polymer-based powder with a fluorine-containing surfactant intermingled therein.

The aggregate-producing method (1) of the invention is the method for producing an aggregate comprising a polymer (hereinafter referred to as "polymer aggregate") comprising carrying out the above-mentioned removal treatment of the fluorine-containing surfactant by contacting the treatment target substance (1) or treatment target substance (2) with the above-mentioned substance B. Like in the method of purifying the treatment target substance of the invention, carbon dioxide is preferred as the substance B.

The polymer aggregate is obtained through the step of subjecting the aqueous dispersion (1) in which primary particles are dispersed in an aqueous medium to such a treatment as coagulation. It is composed of secondary particles formed upon carrying out the coagulation or like treatment. The polymer aggregate may occur either as secondary particles existing in an aqueous medium or as a powder composed of secondary particles.

The polymer mentioned above is preferably a fluoropolymer.

The fluoropolymer is the one obtained by polymerizing a fluorine-containing monomer or monomers. For some intended purposes, it may be the product of copolymerization with a fluorine-free monomer(s).

As the fluorine-containing monomer, there may be mentioned, among others, fluoroolefins, preferably fluoroolefins containing 2-10 carbon atoms; fluorinated cyclic monomers; and fluorinated alkyl vinyl ethers represented by the formula $CY_2=CYOR$ or $CY_2=CYOR^1OR$ (in which Y is H or F, R is an alkyl group containing 1 to 8 carbon atoms with the hydrogen atoms thereof having been partly or wholly substituted by fluorine atoms and $R^1$ is an alkylene group containing 1 to 8 carbon atoms with the hydrogen atoms thereof having been partly or wholly substituted by fluorine atoms.

The fluoroolefins preferably contain 2 to 6 carbon atoms. As the fluoroolefins containing 2 to 6 carbon atoms, there may be mentioned, among others, tetrafluoroethylene [TFE], hexafluoropropylene [HFP], chlorotrifluoroethylene [CTFE], vinyl fluoride, vinylidene fluoride [VdF], trifluoroethylene, hexafluoroisobutylene and perfluorobutylethylene. Preferred as the fluorinated cyclic monomers are perfluoro-2,2-dimethyl-1,3-dioxole [PDD] and perfluoro-2-methylene-4-methyl-1,3-dioxolane [PMD], among others.

In the fluorinated alkyl vinyl ethers, the group R preferably contains 1 to 4 carbon atoms and more preferably is the one whose hydrogen atoms all have been substituted by fluorine atoms, and the group $R^1$ preferably contains 2 to 4 carbon atoms and more preferably is the one whose hydrogen atoms all have been substituted by fluorine atoms.

As the fluorine-free monomer, there may be mentioned hydrocarbon-based monomers having reactivity with the above-mentioned fluorine-containing monomers. As the hydrocarbon-based monomer, there may be mentioned, among others, alkenes such as ethylene, propylene, butylenes and isobutylene; alkyl vinyl ethers such as ethyl vinyl ether, propyl vinyl ether, butyl vinyl ether, isobutyl vinyl ether and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl p-tert-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate and vinyl hydroxycyclohexanecarboxylate; alkyl allyl ethers such as ethyl allyl ether, propyl allyl ether, butyl allyl ether, isobutyl allyl ether and cyclohexyl allyl ether; and alkyl allyl esters such as allyl acetate, allyl propionate, allyl butyrate, allyl isobutyrate and allyl cyclohexanecarboxylate.

The fluorine-free monomer may also be a functional group-containing hydrocarbon type monomer. As the functional group-containing hydrocarbon type monomer, there may be mentioned, for example, hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; carboxyl group-containing, fluorine-free monomers such as itaconic acid, succinic acid, succinic anhydride, fumaric acid, fumaric anhydride, crotonic acid, maleic acid, maleic anhydride and perfluorobutenoic acid; glycidyl group-containing, fluorine-free monomers such as glycidyl vinyl ether and glycidyl allyl ether; amino group-containing, fluorine-free monomers such as aminoalkyl vinyl ethers and aminoalkyl allyl ethers; and amide group-containing, fluorine-free monomers such as (meth)acrylamide and methylolacrylamide.

As the fluoropolymer resulting from copolymerization of the fluorine-free monomer(s), there may be mentioned, for example, TFE polymers in which the monomer showing the highest mole fraction (hereinafter, "most abundant monomer") among the monomers constituting the polymer is TFE, VdF polymers in which the most abundant monomer is VdF, and CTFE polymers in which the most abundant monomer is CTFE.

The TFE polymers may suitably be TFE homopolymers or copolymers derived from (1) TFE, (2) one or more fluorine-containing monomers other than TFE containing 2 to 8 carbon atoms, in particular HFP and/or CTFE, and (3) some other monomer or monomers. As the other monomer (3), there may be mentioned, for example, fluoro(alkyl vinyl ether) species whose alkyl group contains 1 to 5 carbon atoms, in particular 1 to 3 carbon atoms; fluorodioxoles; perfluoroalkylethylenes; and ω-hydroperfluoroolefins.

The TFE polymers may further be copolymers of TFE and one or more fluorine-free monomers. As the fluorine-free monomers, there may be mentioned, for example, alkenes such as ethylene and propylene; vinyl esters; and vinyl ethers. The TFE polymers may further be copolymers derived from TFE, one or more fluorine-containing monomers containing 2 to 8 carbon atoms and one or more fluorine-free monomers.

The VdF polymers may suitably be VdF homopolymers [PVdF] or copolymers derived from (1) VdF, (2) one or more fluorine-containing monomers other than VdF containing 2 to 8 carbon atoms, in particular TFE, HFP and/or CTFE, and (3) a perfluoro(alkyl vinyl ether) [PAVE] containing an alkyl group containing 1 to 5 carbon atoms, in particular 1 to 3 carbon atoms, among others.

The CTFE polymers may suitably be CTFE homopolymers or copolymers derived from (1) CTFE, (2) one or more fluorine-containing monomers other than CTFE containing 2 to 8 carbon atoms, in particular TFE and/or HFP, and (3) a perfluoro(alkyl vinyl ether) containing an alkyl group containing 1 to 5 carbon atoms, in particular 1 to 3 carbon atoms.

The CTFE copolymers may also be copolymers derived from CTFE and one or more fluorine-free monomers. Included among the fluorine-free monomers are alkenes such as ethylene and propylene; vinyl esters; and vinyl ethers.

The above-mentioned fluoropolymer may be resin-like or elastomeric, for instance.

When the fluoropolymer is elastomeric, the following monomer combinations are preferred: TFE/PAVE copolymers, VdF/HFP copolymers, VdF/TFE/HFP copolymers, VdF/PAVE/TFE copolymers, VdF/perfluoro(methyl vinyl ether) [PMVE] copolymers, VdF/HFP/PMVE copolymers, VdF/TFE/PMVE copolymers, VdF/PMVE/HFP/TFE copolymers, and copolymers of TFE, propylene [Pr] and some other monomer or monomers.

The above-mentioned TFE/PAVE copolymers preferably have a composition of 40 to 90/10 to 60 (mole percent), the above-mentioned VdF/TFE/HFP copolymers preferably have a composition of 30 to 85/0 to 30/15 to 40 (mole percent) and, in the case of the above-mentioned VdF/PAVE/TFE, the composition thereof is preferably 10 to 90/10 to 40/0 to 80 (mole percent). In the case of the above-mentioned VdF/PMVE copolymers, the composition thereof is preferably 65 to 90/10 to 35 (mole percent); in the case of the VdF/HFP/PMVE copolymers, the composition thereof is preferably 65 to 90/3 to 25/3 to 25 (mole percent); in the case of the VdF/TFE/PMVE copolymers, the composition thereof is preferably 40 to 80/3 to 40/15 to 35 (mole percent); and, in the case of the VdF/PMVE/HFP/TFE copolymers, the composition thereof is preferably 40 to 80/3 to 25/3 to 25/3 to 40 (mole percent). The above-mentioned copolymers of TFE and Pr and some other monomer(s) preferably have a composition of 40 to 70/30 to 60/0 to 20 (mole percent).

In the practice of the invention, the above-mentioned fluoropolymer is preferably a polytetrafluoroethylene polymer.

The polytetrafluoroethylene polymer [PTFE polymer] so referred to herein conceptually includes not only TFE homopolymers but also those copolymers of TFE and a modifier monomer which are not melt-processable (hereinafter referred to as "modified polytetrafluoroethylene (modified PTFE)").

As the modifier monomer, there may be mentioned, for example, perhaloolefins such as HFP and CTFE; fluoro(alkyl vinyl ether) species whose alkyl group contains 1 to 5 carbon atoms, in particular 1 to 3 carbon atoms; fluorinated cyclic monomers such as fluorodioxoles; perhaloalkylethylenes; and ω-hydroperhaloolefins.

The modifier monomer content in the modified PTFE is generally within the range of 0.001 to 2 mole percent.

The aggregate-producing method (1) of the invention uses the above-mentioned method of purifying treatment target substances and, therefore, can give, as the polymer aggregates, those products satisfactorily reduced in fluorine-containing surfactant content.

The method of preparing a fluorine-containing-surfactant-reduced water according to the invention comprises preparing the fluorine-containing-surfactant-reduced water reduced in fluorine-containing surfactant content using the above-mentioned method of purifying the treatment target substance. The above-mentioned method of the fluorine-containing-surfactant-reduced water reduced in fluorine-containing surfactant content can be applied to the treatment target substance (3) in the method of purifying the treatment target substance mentioned above. The fluorine-containing-surfactant-reduced water have a reduced fluorine-containing surfactant content as a result of the removal treatment of the fluorine-containing surfactant thereof which comprises contacting that substance (3) with the above-mentioned substance B.

The phrase "reduced, or reduced in, fluorine-containing surfactant content" as used herein means that the fluorine-containing surfactant content relative to total mass of the treatment target substance after the removal treatment of the fluorine-containing surfactant by the above-mentioned method of purifying the treatment target substance is not higher than 1000 ppm, preferably not higher than 100 ppm, more preferably not higher than 10 ppm.

By the method of preparing the fluorine-containing-surfactant-reduced water according to the invention, it is possible to recover the fluorine-containing surfactant removed from the treatment target substance by separating the same from the substance B, as mentioned hereinabove referring to the method of purifying the treatment target substance according to the invention.

The method of purifying the treatment target substance according to the invention can satisfactorily reduce the fluorine-containing surfactant content to such an extent as within the above-mentioned range and, therefore, the supernatant obtained, for example, by subjecting to coagulation an aqueous dispersion of the particles of a polymer obtained by polymerization in an aqueous medium in the presence of a fluorine-containing surfactant comprises the fluorine-containing surfactant and water and is substantially free of the polymer. On the contrary, in the case of the supernatant recovered following coagulation using a coagulant, an aqueous dispersion containing the uncoagulated portion of the polymer remaining uncoagulated substantially remains, so that the fluorine-containing surfactant and the aqueous dispersion containing the uncoagulated polymer must be separated/recovered from each other prior to discarding the supernatant as industrial waste and this is very troublesome.

By using the method of preparing the fluorine-containing-surfactant-reduced water according to the invention, it is possible to remove/recover the fluorine-containing surfactant using an industrial plant operated on the same principle as the equipment generally used in ordinary laboratories; thus, the disposal of the supernatant can be carried out with ease.

The method of producing an aggregate according to the invention is a method for the production of the aggregate comprising a polymer, and the above method of producing an aggregate comprises the step of carrying out a coagulation treatment of the above aqueous dispersion by bringing an aqueous dispersion containing a particle comprising the polymer dispersed therein into contact with an substance B. Hereinafter, the method of producing the aggregate of the invention which comprises the step of carrying out the above coagulation treatment is sometimes referred to as "aggregate-producing method (2)" of the invention.

The substance B is a gas under standard condition ($10^5$ Pa, 0° C.) and is the same one as the substance B described hereinabove referring to the method of purifying the treatment target substance of the invention. Preferably, it is carbon dioxide.

The "aqueous dispersion containing a particle comprising the polymer dispersed therein" is preferably an aqueous dispersion comprising primary polymer particles dispersion in an aqueous medium. The method of "bringing into contact with substance B" is the same as the method of bringing the treatment target substance (1) into contact with the substance B in the above-mentioned method of purifying the treatment target substance of the invention, and the above-mentioned aqueous dispersion comprising primary particles dispersed in an aqueous medium is preferably used as the treatment target substance (1).

Preferred as the "aqueous dispersion containing a particle comprising the polymer dispersed therein" is an aqueous dispersion comprising primary polymer particles dispersed in an aqueous medium. The aqueous dispersion need not contain any fluorine-containing surfactant but may be one containing a fluorine-containing surfactant. When the aqueous dispersion contains a fluorine-containing surfactant, it is possible to carry out the coagulation treatment of the aqueous dispersion in combination with the above-mentioned removal treatment of the fluorine-containing surfactant according to method of purifying the treatment target substance of the invention.

The particles comprising the polymer dispersed in the aqueous dispersion, when brought into contact with the substance B, can coagulate to form polymer aggregates. When the aqueous dispersion is one containing a fluorine-containing surfactant, it is presumable that the particles comprising the polymer dispersed in the aqueous dispersion, on the occasion of contacting of the treatment target substance (1) with the substance B, are reduced in dispersing force in the aqueous dispersion as a result of the reduction in fluorine-containing surfactant content in the aqueous dispersion upon such contacting, hence the particles flock together to form aggregates.

An aqueous dispersion (1) obtained by carrying out radical polymerization can be used as the fluorine-containing surfactant-containing aqueous dispersion mentioned above. This aqueous dispersion (1) generally has a water content of about 70% by mass in an unconcentrated state, and this water content falls within the above-mentioned preferred range of the amount of (i) water relative to (ii) the nonwater component, overlapping the water content range enabling efficient fluorine-containing surfactant removal. The above-mentioned aggregate formation is considered to be also a result of mechanical shearing by stirring. Upon removal of the aggregates, the aqueous dispersion becomes transparent.

When the aqueous dispersion contains a fluorine-containing surfactant, the aggregate producing method of the invention makes it possible to allow the removal treatment of the fluorine-containing surfactant and the coagulation treatment to proceed simultaneously. Thus, unlike the prior art according to which the residual liquid phase after separation of the coagulation product formed upon coagulation by addition of an acid is to be subjected to removal treatment of the fluorine-containing surfactant, such process is now no longer necessary; since the fluorine-containing surfactant is substantially removed in the process of coagulation, the wastewater after coagulation can be discharged as such.

The aggregates obtained by the aggregate producing method of the invention can have a particle/grain size approximately the same as the particle/grain size of the particles/grains obtainable by any of the coagulation/flocculation methods known in the art and the size is generally 10 to 2000 μm. A preferred lower limit is 180 μm, a more preferred lower limit is 200 μm, and a preferred upper limit is 700 μm.

In carrying out the aggregate producing method of the invention, the coagulation treatment of the aqueous dispersion is preferably carried out at a specific treatment temperature (T° C.) and at a specific treatment pressure (P Pa), and the ratio (T/Tc) between the specific treatment temperature (T° C.) and the critical temperature [Tc° C.] of the substance B is preferably not lower than 0.8 and the ratio (P/Pc) between the specific treatment pressure (P Pa) and the critical pressure (Pc Pa) of the substance B is preferably not lower than 0.8.

More preferably, the specific treatment temperature (T) is not lower than the critical temperature (Tc) of the substance B and the specific treatment pressure is not lower than the critical pressure (Pc) of the substance B. When carbon dioxide in a supercritical condition is used as the substance B, the upper limit is preferably set at the same level as mentioned hereinabove referring to the method of purifying the treatment target substance of the invention.

In practicing the aggregate producing method of the invention, the polymer is preferably a fluoropolymer, and the fluoropolymer is preferably a tetrafluoroethylene polymer. The fluoropolymer and tetrafluoroethylene polymer are as described hereinabove referring to the aggregate producing method (1) of the invention.

EXPLANATION OF SYMBOLS

1—$CO_2$ cylinder
2—condenser
3—surfactant solution
4—water bath
5—stirrer
6—heater
7—automatic back pressure-regulating valve
8—ice bath

BEST MODES FOR CARRYING OUT THE INVENTION

The following examples illustrate the present invention in further detail. These examples are, however, by no means limitative of the scope of the invention.

EXAMPLE 1

Figure 1:
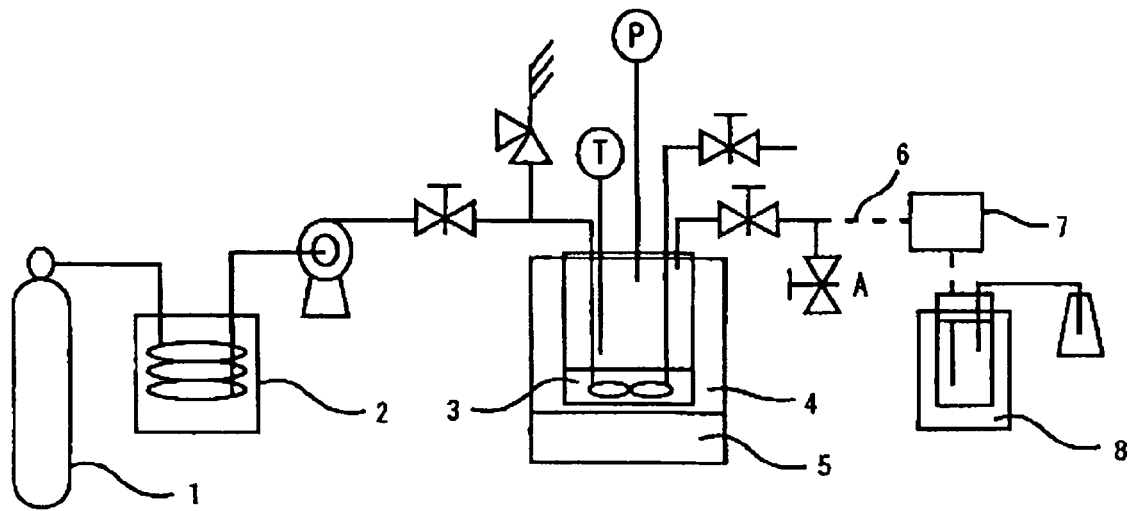
FIG. 1 is a schematic representation of the laboratory equipment used in supercritical extraction experiments.

Removal Treatment of a Fluorine-Containing Surfactant from an Aqueous Solution Containing a Fluorine-Containing Surfactant (1) The laboratory equipment used was a flow system such as the one schematically shown in FIG. 1. Thus, the carbon dioxide gas fed from a $CO_2$ cylinder 1 was cooled in a condenser 2, and the pressure and temperature thereof were adjusted so as to create a supercritical condition. A 400-g portion of the thus-obtained supercritical carbon dioxide was passed through an aqueous solution of a fluorine-containing surfactant (name of the surfactant: ammonium perfluorooctanoate [APFO]; initial surfactant concentration=550 ppm) with stirring using a stirrer (rate of stirring: 800 rpm) at a flow rate of 12.2 g of carbon dioxide/minute. The supercritical carbon dioxide-containing fluid after the passage was passed through a back pressure-regulating valve to decrease the pressure to 0.1 MPa and the density $\rho$ to 2.0 g/liter, and the fluorine-containing surfactant was recovered on an ice bath.

Figure 2:
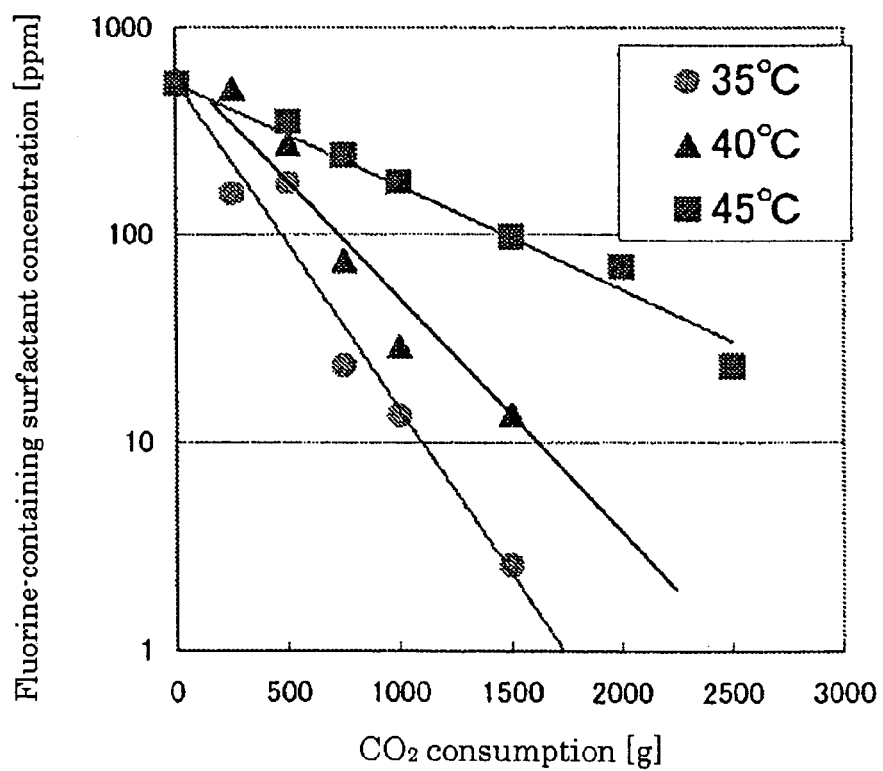
FIG. 2 is a graphic representation of the temperature dependency of the rate of fluorine-containing surfactant extraction at 9 MPa.

The above removal treatment was repeated while one of the pressure and temperature was fixed and the other was varied. In this manner, the fluorine-containing surfactant concentrations before and after treatment (before: $C_0$; after: C) [ppm] were examined. The fluorine-containing surfactant concentrations were determined using a high performance liquid chromatograph [HPLC] (product of Tosoh Corp., model SC 8010 main unit). The results are shown in FIG. 2 and FIG. 3.

Figure 3:
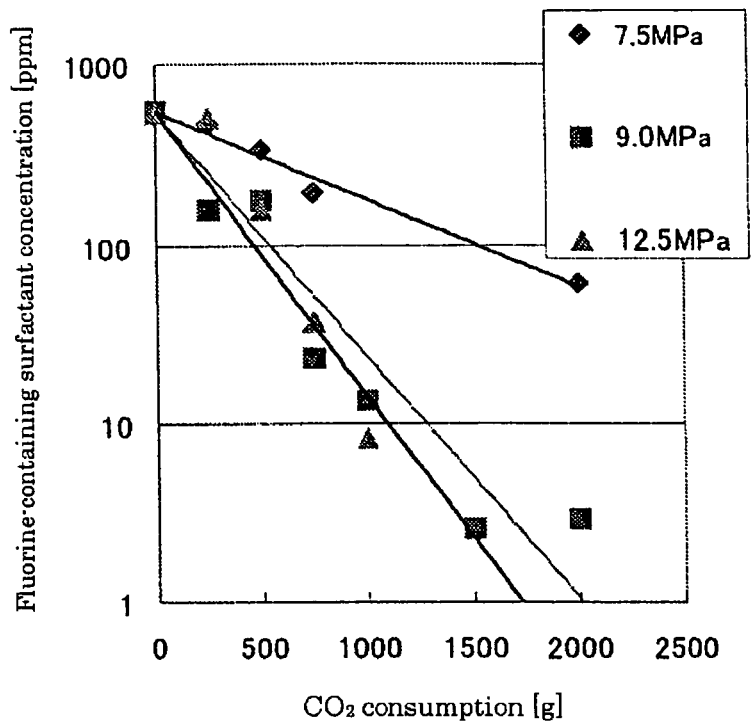
FIG. 3 is a graphic representation of the pressure dependency of the rate of fluorine-containing surfactant extraction at 35° C.

Within the range of the experiments carried out, it was found that there is a tendency for the fluorine-containing surfactant extraction efficiency (rate) to be improved when the temperature is lowered (from FIG. 2) or the pressure is increased (from FIG. 3).

(2) Carbon dioxide was passed through an aqueous surfactant solution using a flow system apparatus in the same manner as in Example 1 (1) except that 66.5 g of the same aqueous fluorine-containing surfactant solution (surfactant name: ammonium perfluorooctanoate; initial surfactant concentration=1855 ppm) as used in Example 1 (1) prior to the passage of supercritical carbon dioxide was used and the consumption of supercritical carbon dioxide ($\rho$=662 g/liter) was varied as shown in Table 1, and the fluorine-containing surfactant concentrations in the aqueous fluorine-containing surfactant solutions before and after the passage were determined. The results are shown in Table 1 and FIG. 4.

Figure 4:
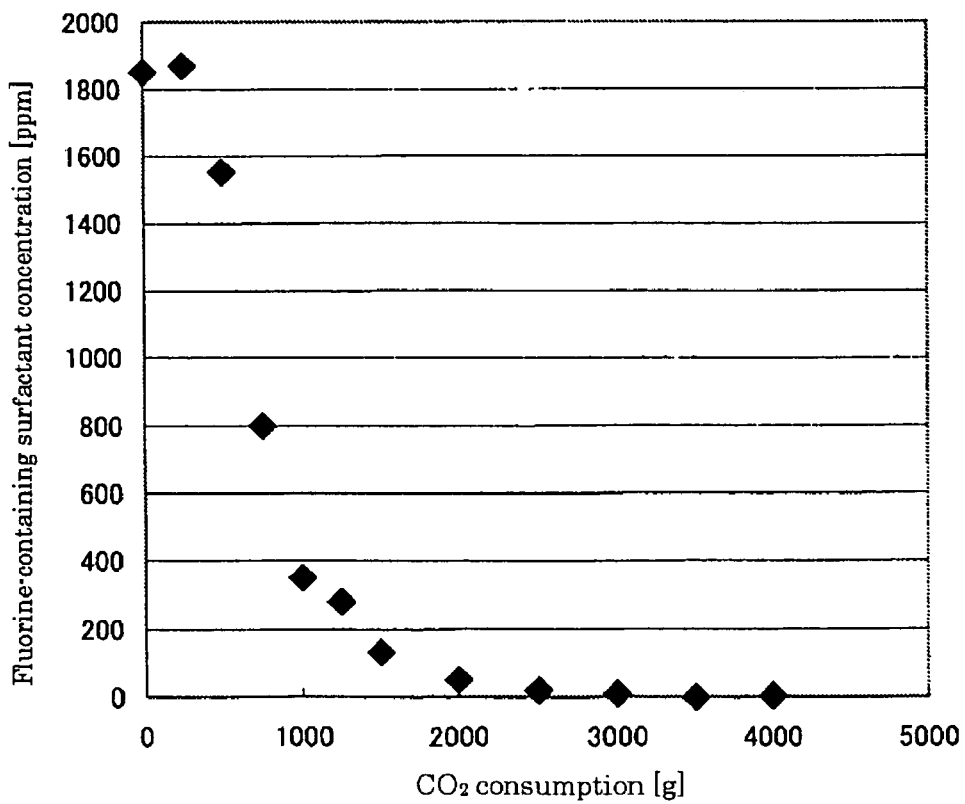
FIG. 4 is a graphic representation-of the changes in fluorine-containing surfactant concentration with the increasing carbon dioxide consumption.
Figure 5:
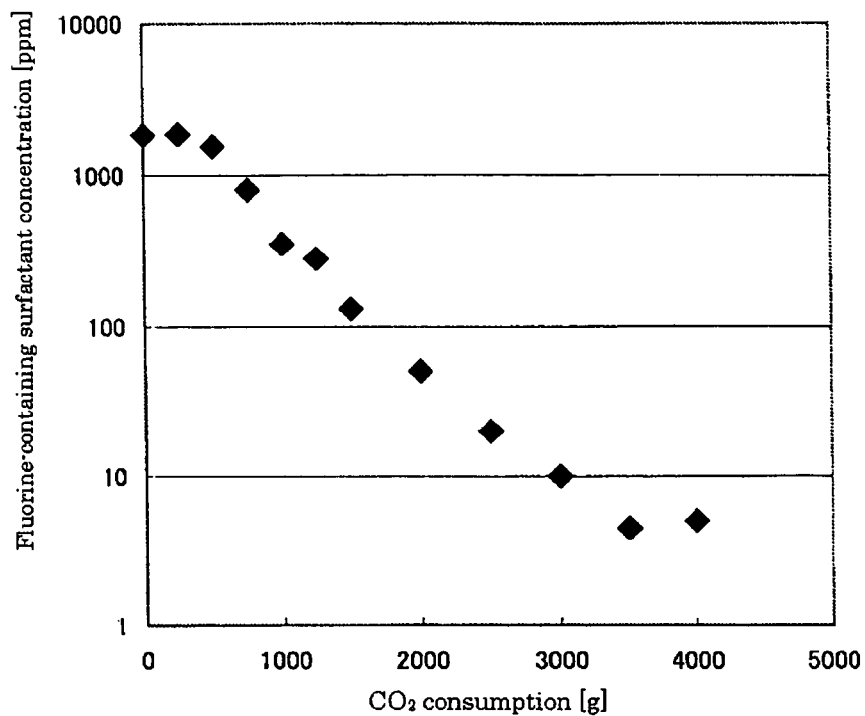
FIG. 5 is another form of graphic representation of the graph shown in FIG. 4, with the ordinate being a logarithmic axis.
Figure 6:
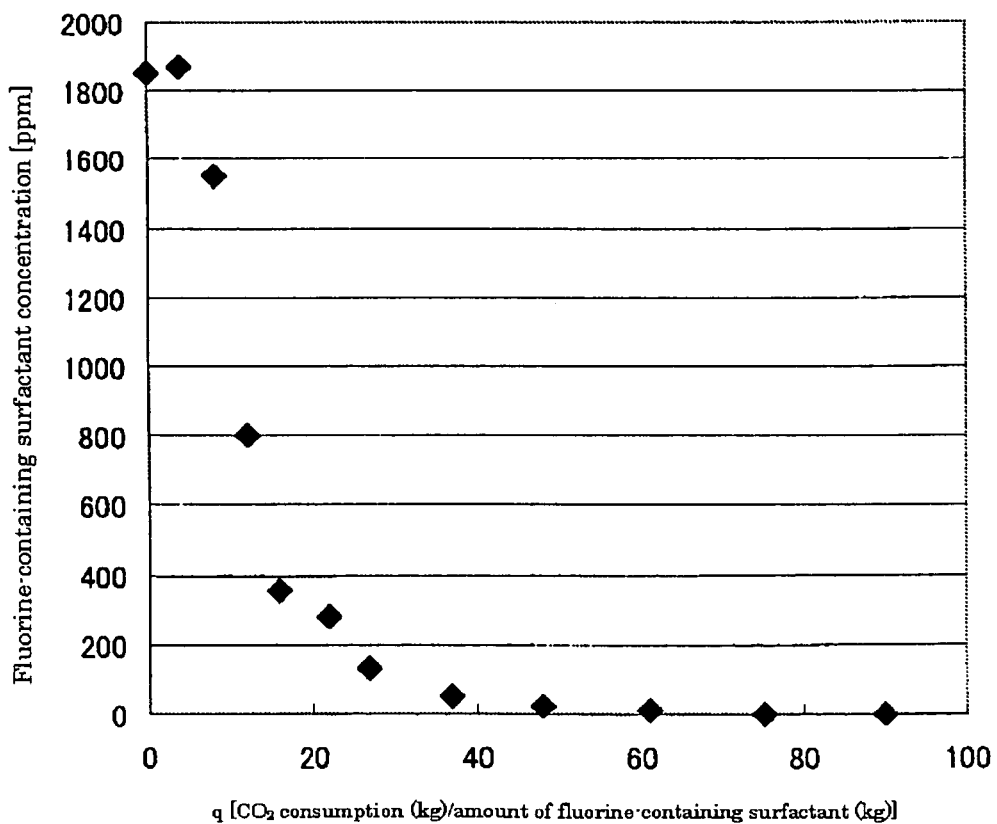
FIG. 6 is a further form of graphic representation of the graph shown in FIG. 4 as obtained by rearrangement in a manner such that the abscissa now denotes the dimensionless quantity "carbon dioxide consumption to amount of fluorine-containing surfactant ratio".

When, for example, the aqueous fluorine-containing surfactant solution was used, the surfactant concentration decreased from 1855 ppm prior to the removal treatment to 3.2 ppm after consumption of 4000 g of carbon dioxide, as shown in Table 1 and FIG. 4. Among the data shown in Table 1, the logarithm of the fluorine-containing surfactant concentration in each aqueous fluorine-containing surfactant solution after carbon dioxide passage was plotted along the ordinate against the carbon dioxide concentration along the abscissa. The thus-obtained semilogarithmic plotting results are shown in FIG. 5. As shown in FIG. 5, the plots in the carbon dioxide consumption range of 250 to 3500 g are approximately on a straight line. Thus, it was found that, for attaining x-fold dilution in this range, it is sufficient to use carbon dioxide in an amount multiplied x times. From the value of the gradient of the straight line, it was found that, for 10-fold diluting of the aqueous fluorine-containing surfactant solution, for instance, 1280 g of carbon dioxide is required. FIG. 6 shows the results of rearrangement of the above results as obtained by causing the abscissa to denote the dimensionless quantity q (ratio of the carbon dioxide consumption to the quantity of the fluorine-containing surfactant to be extracted). From FIG. 6, it was revealed that when q is about 50, a stationary state is reached.

EXAMPLE 2

Figure 7:
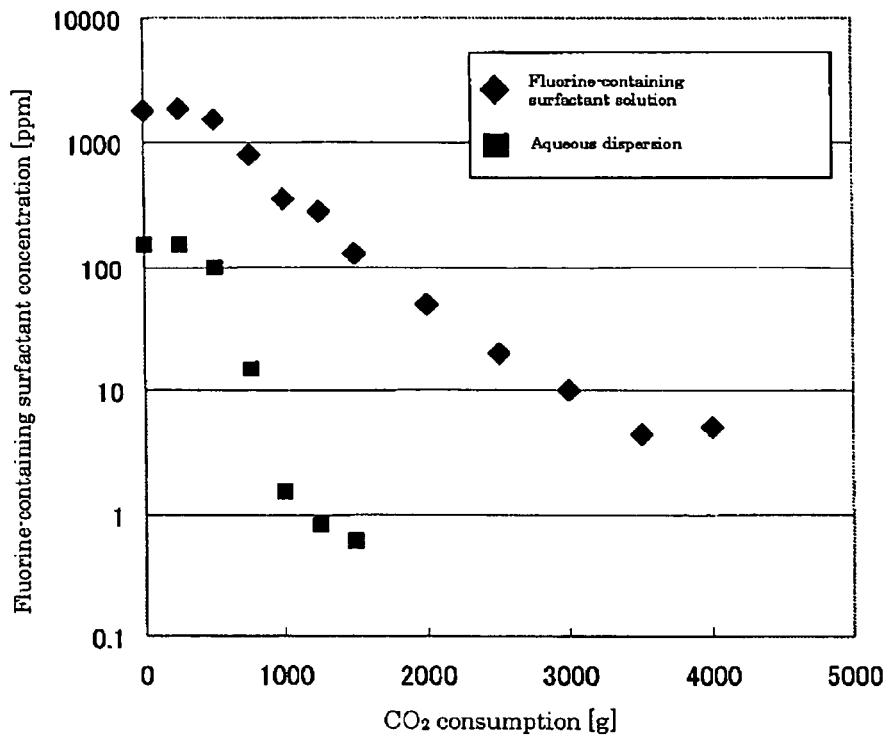
FIG. 7 is a graphic representation of the changes in fluorine-containing surfactant concentration, as expressed in terms of logarithms of surfactant concentrations, in an aqueous fluorine-containing surfactant solution and an aqueous dispersion with the increasing carbon dioxide consumption.
Figure 8:
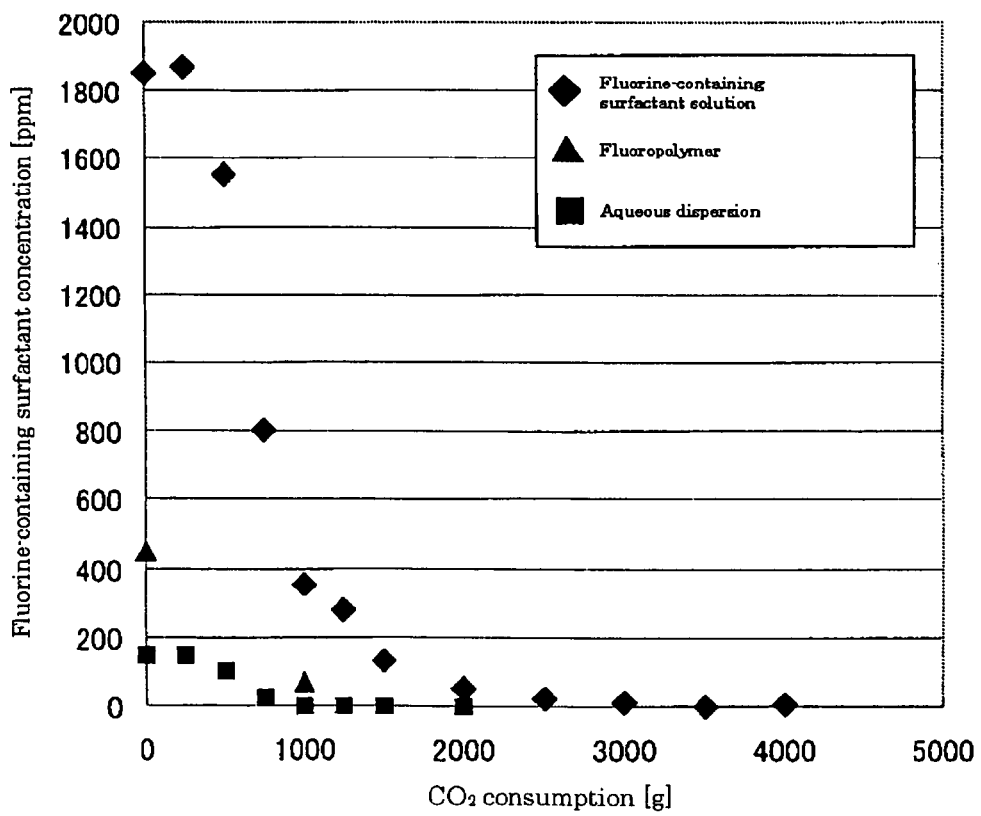
FIG. 8 is a graphic representation of the changes in fluorine-containing surfactant concentration in an aqueous fluorine-containing surfactant solution, an aqueous dispersion and a fluoropolymer with the increasing carbon dioxide consumption.

Removal Treatment of a Fluorine-Containing Surfactant from an Aqueous Dispersion The removal treatment was carried out in the same manner as in Example 1 (1) except that 51.3 g of an aqueous dispersion of a fluoropolymer (TFE homopolymer; fluoropolymer concentration 0.2% by mass) containing 147.0 ppm of ammonium perfluorooctanoate was used as the treatment target substance in lieu of the aqueous fluorine-containing surfactant solution and that the flow rate of supercritical carbon dioxide (density 662 g/liter, 9 MPa, 35° C.) was 12.3 g/minute. The results are shown, together with the results of Example 1 (2), in Table 1, FIG. 7 and FIG. 8. As shown in Table 1, the fluorine-containing surfactant in the aqueous dispersion was extracted with carbon dioxide in the same manner as in Example 1 (1) and, when the carbon dioxide consumption amounted to 1500 g, the fluorine-containing surfactant concentration was 0.6 ppm. Further, FIG. 7 revealed that when the aqueous dispersion is subjected to removal treatment, the extraction efficiency is higher and the amount of carbon dioxide as required for the arrival at an equilibrium is smaller as compared with the removal treatment of the aqueous fluorine-containing surfactant solution. Furthermore, photographic comparison of the conditions of the solutions before and after removal treatment revealed that the solutions after removal treatment were transparent, indicating the simultaneous progress of fluorine-containing surfactant extraction and polymer coagulation.

EXAMPLE 3

Removal Treatment of a Fluorine-Containing Surfactant from a Fluoropolymer Powder The removal treatment was carried out in the same manner as in Example 2 except that 1.86 g of a fluoropolymer powder containing a fluorine-containing surfactant [APFO] was used as the treatment target substance. The fluorine-containing surfactant concentrations in the fluoropolymer samples before and after removal treatment were determined by extracting the surfactant from the polymer samples with acetone, evaporating off the acetone at 45° C., adding water and subjecting the resulting solutions to quantitation using a HPLC. The results are shown, together with the results of Example 1 (2) and of Example 2, in Table 1 and FIG. 8. It was found that, as a result of the removal treatment of the fluorine-containing surfactant from the fluoropolymer powder, the fluorine-containing surfactant level lowered from the initial 443.0 ppm to 86.5 ppm at the time of the carbon dioxide consumption of 1000 g.

TABLE 1

| CO2 consumption | Fluorine-containing surfactant concentration [ppm] | | |
|---|---|---|---|
| [g] | Surfactant solution | Polymer | Aqueous dispersion |
| 0 | 1855 | 443.0 | 147.0 |
| 250 | 1865 | — | 141.8 |
| 500 | 1546 | — | 102.2 |
| 750 | 800.8 | — | 13.9 |
| 1000 | 359.9 | 86.5 | 1.4 |
| 1250 | 271.8 | — | 0.9 |
| 1500 | 140.8 | — | 0.6 |
| 2000 | — | — | — |
| 2500 | 52.4 | — | — |
| 3000 | 19.1 | — | — |
| 3500 | 10.5 | — | — |
| 4000 | 3.2 | — | — |

EXAMPLE 4

Coagulation Treatment of a Fluoropolymer from an Aqueous Dispersion

Using the flow system equipment shown in FIG. 1, 245.3 g of supercritical carbon dioxide at 9 MPa and 35° C. was passed through 100 g of an aqueous dispersion (fluoropolymer concentration: 30% by mass), whereby 25.2% of the fluoropolymer in the aqueous dispersion was coagulated.

The coagulated fluoropolymer was observed under a scanning electron microscope [SEM] and found to be roughly identical in particle diameter (average particle diameter=200 μm) to a product already on the market (trademark: Polyflon PTFE Fine Powder F-104, product of Daikin Industries).

EXAMPLE 5

Relation Between the Water Content of the Treatment Target Substance and the Fluorine-Containing Surfactant Extraction Rate Using the flow system equipment shown in FIG. 1, 3 g of a dry fluoropolymer (TFE homopolymer) powder (containing a fluorine-containing surfactant [AFPO]) as the treatment target substance was placed, together with an amount, specified in Table 2, of water, in a vessel in advance, the vessel inside was adjusted to a critical condition (15 MPa, 35° C.), and 500 g of supercritical carbon dioxide (density 815 g/liter) was passed through the vessel at a flow rate of 12.2 g/minute to extract the fluorine-containing surfactant contained in the dry fluoropolymer powder therewith. The results of analysis of the relation between the water content of the treatment target substance and the fluorine-containing surfactant extraction rate are shown in Table 2 and FIG. 9.

The fluorine-containing surfactant extraction rate is defined as follows:

$$\text{Extraction rate } [-] = 1 - (C_{APFO}/C_{0,APFO})$$

In the above formula, $C_{0,APFO}$ represents the concentration ($b_0/a_0$ ppm) of the fluorine-containing surfactant ($b_0$ grams) occurring in $a_0$ grams of the dry fluoropolymer powder prior to extraction. Used as the $C_{0,APFO}$ was the value obtained by adding 5 g of methanol to 0.5 g of the dry fluoropolymer powder used as the treatment target substance, centrifuging the resulting mixture (10000 rpm, 30 minutes) and quantitating the fluorine-containing surfactant contained in the resulting supernatant using a HPLC. $C_{APFO}$ represents the concentration (b/a ppm) of the fluorine-containing surfactant (b grams) remaining in a grams of the fluoropolymer after extraction from the treatment target substance. The $C_{APFO}$ was determined in the same manner as in the case of $C_{0,APFO}$ using the residue (containing the fluoropolymer and fluorine-containing surfactant) after extraction from the treatment target substance in lieu of the dry fluoropolymer powder.

TABLE 2

| Dry fluoropolymer powder: water [mass ratio] | Water content of treatment target substance [% by mass] | Fluorine-containing surfactant extraction rate [-] |
|---|---|---|
| 9:1 | 10 | 0.119 |
| 8:2 | 20 | 0.404 |
| 6:4 | 40 | 0.699 |
| 4:6 | 60 | 0.926 |
| 1:4 | 79.5 | 1 |
| 1:9 | 90 | 1 |

Figure 9:
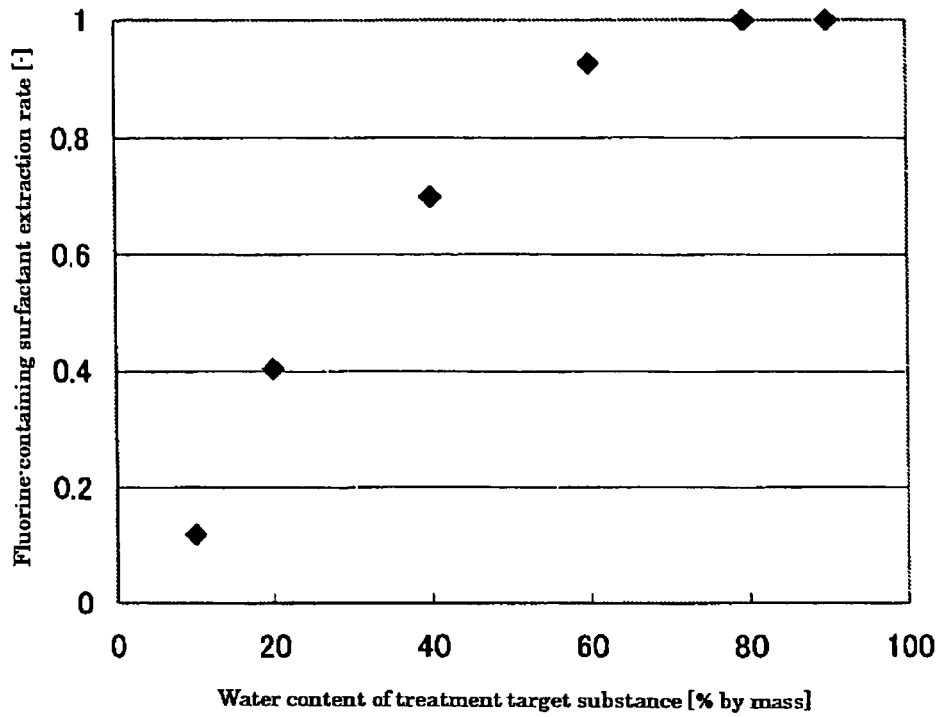
FIG. 9 is a graphic representation of the relationship between the water content of the treatment target substance and the fluorine-containing surfactant extraction rate.

As shown in Table 2 and FIG. 9, it was found that the fluorine-containing surfactant extraction rate at a fixed level of $CO_2$ consumption becomes higher as the water content of the treatment target substance increases.

EXAMPLE 6

Relation Among the Water Content of the Treatment Target Substance, the Fluorine-Containing Surfactant Extraction Rate and the $CO_2$ Consumption Fluorine-containing surfactant extraction was carried out in the same manner as in Example 5 except that the carbon dioxide consumption (flow) was 300 g or 1000 g, and the fluorine-containing surfactant extraction rates were determined. The results, together with the results obtained in Example 5, are shown in FIG. 10.

Figure 10:
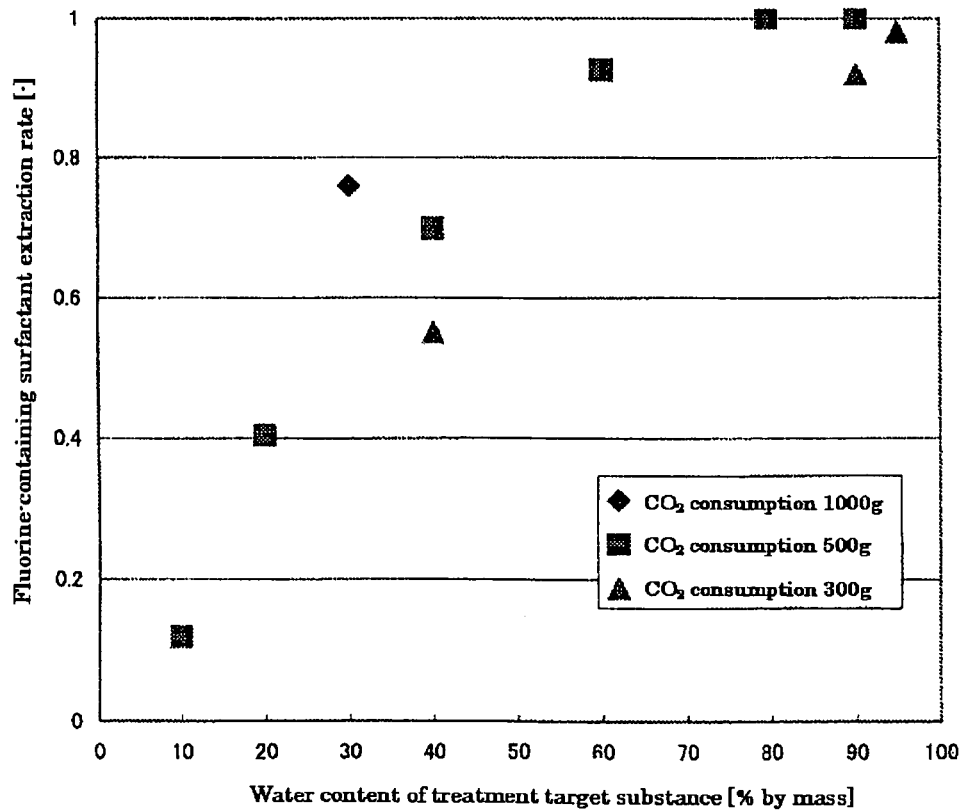
FIG. 10 is a graphic representation of the relationship among the water content of the treatment target substance, the carbon dioxide consumption and the fluorine-containing surfactant extraction rate.

FIG. 10 revealed that, within the range of the water contents of the treatment target substances, there is a tendency for the fluorine-containing surfactant extraction rate to become higher as the $CO_2$ consumption increases and the water content of the treatment target substance increases.

INDUSTRIAL APPLICABILITY

The method of purifying the treatment target substance of the invention can be favorably utilized as a method of efficiently removing, from a treatment target substance containing a fluorine-containing surfactant, the fluorine-containing surfactant.

EFFECTS OF THE INVENTION

The method of purifying the treatment target substance of the invention, which has the constitution described herein- The invention claim is:

1. A method of purifying a treatment target substance containing a fluorine-containing surfactant and water which comprises removing at least part of the fluorine-containing surfactant from said treatment target substance by contacting said treatment target substance with a substance B comprising carbon dioxide, wherein said substance B is a gas under standard conditions ($10^5$ Pa, 0° C.), said fluorine-containing surfactant is an ether oxygen-free anionic compound represented by the general formula (1):

$$Y-(CF_2)_{x1}-(CH_2)_{y1}-A \quad (1)$$

wherein Y represents H or F, x1 represents an integer of 4 to 13, y1 represents an integer of 0 to 3 and A represents —$SO_3M$ or —COOM (in which M represents H, $NH_4$, Li, Na or K), or an ether oxygen-containing anionic compound represented by the general formula (2):

$$F(CF_2)_{x2}O(CFXCF_2O)_{y2}-CFX-A \quad (2)$$

wherein x2 represents an integer of 1 to 5, y2 represents an integer of 0 to 10, X represents F or $CF_3$ and A represents —$SO_3M$ or —COOM (in which M represents H, $NH_4$, Li, Na or K).

2. The method of purifying the treatment target substance according to claim 1, wherein said removing is carried out at a temperature not lower than 20° C. and at a pressure of not lower than 4 MPa.

3. The method of purifying the treatment target substance according to claim 1, wherein said removing is carried out at a temperature not lower than the critical temperature of carbon dioxide and at a pressure not lower than the critical pressure of carbon dioxide.

4. The method of purifying the treatment target substance according to claim 1, wherein the treatment target substance comprises (i) water and (ii) a nonwater component other than said water (i) containing the fluorine-containing surfactant, said nonwater component (ii) further contains a polymer or contains no polymer, said water (i) is in an amount of more than 0.1 part by mass per 100 parts by mass of said nonwater component {ii).

5. The method of purifying the treatment target substance according to claim 1, wherein the treatment target substance is an aqueous dispersion comprising a polymer and water.

6. The method of purifying the treatment target substance according to claim 1, wherein the treatment target substance is an aqueous nondispersion containing a polymer and water or a wet powder containing a polymer and water.

7. The method of purifying the treatment target substance according to claim 4, wherein the polymer is a fluoropolymer.

8. The method of purifying the treatment target substance according to claim 7, wherein the fluoropolymer is a polytetrafluoroethylene polymer.

9. The method of purifying the treatment target substance according to claim 1, wherein the treatment target substance further contains water, said treatment target substance substantially contains no polymer.

10. A method of producing an aggregate, which comprises producing an aggregate comprising a polymer using the method of purifying the treatment target substance according to claim 5.

11. A method of preparing a fluorine-containing-surfactant-reduced water, which comprises preparing the fluorine-containing-surfactant-reduced water reduced in fluorine-containing surfactant content using the method of purifying the treatment target substance according to claim 9.

12. A method of producing an aggregate for the production of the aggregate comprising a polymer, which comprises coagulating an aqueous dispersion containing fluorine-containing surfactant and in which a particle comprising said polymer is dispersed and removing at least part of said fluorine-containing surfactant by contacting said aqueous dispersion with a substance B comprising carbon dioxide, said substance B being a gas under standard condition ($10^5$ Pa, 0° C.), and wherein said polymer is a fluoropolymer.

13. The method of producing the aggregate according to claim 12, wherein said coagulating is carried out at a specific treatment temperature (T° C.) and at a specific treatment pressure (P Pa), the ratio (T/Tc) between said specific treatment temperature (T° C.) and the critical temperature (Tc° C.) of the substance B is not lower than 0.8, the ratio (P/Pc) between said specific treatment pressure (P Pa) and the critical pressure (Pc Pa) of said substance B is not lower than 0.8.

14. The method of producing the aggregate according to claim 13, wherein the specific treatment temperature (T) is not lower than the critical temperature (Tc) of the substance B, the specific treatment pressure (P) is not lower than the critical pressure (Pc) of said substance B.

15. The method of producing the aggregate according to claim 12, wherein the fluoropolymer is a polytetrafluoroethylene polymer.

* * * * *